J. J. MACBETH.
SHOCK ABSORBER.
APPLICATION FILED APR. 9, 1917.
1,239,200.
Patented Sept. 4, 1917.
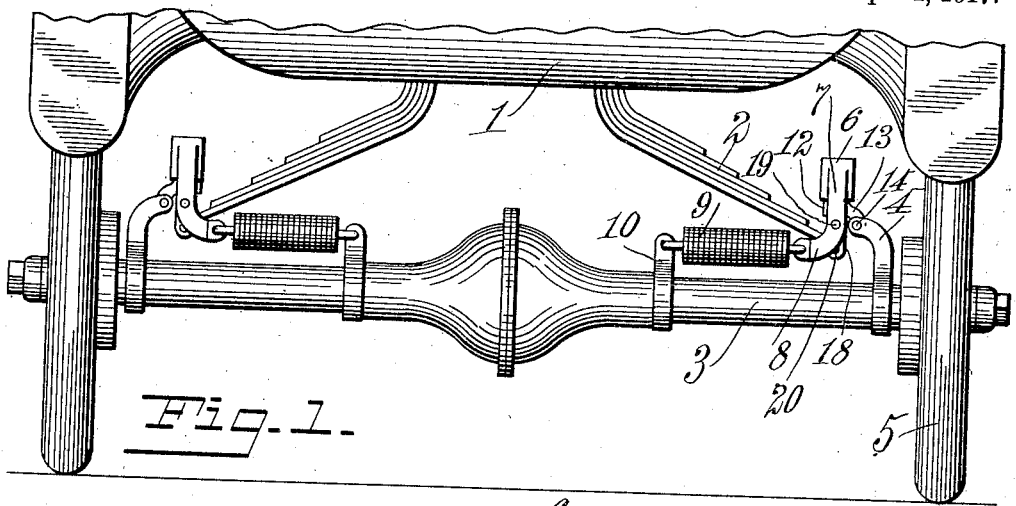
Fig. 1.
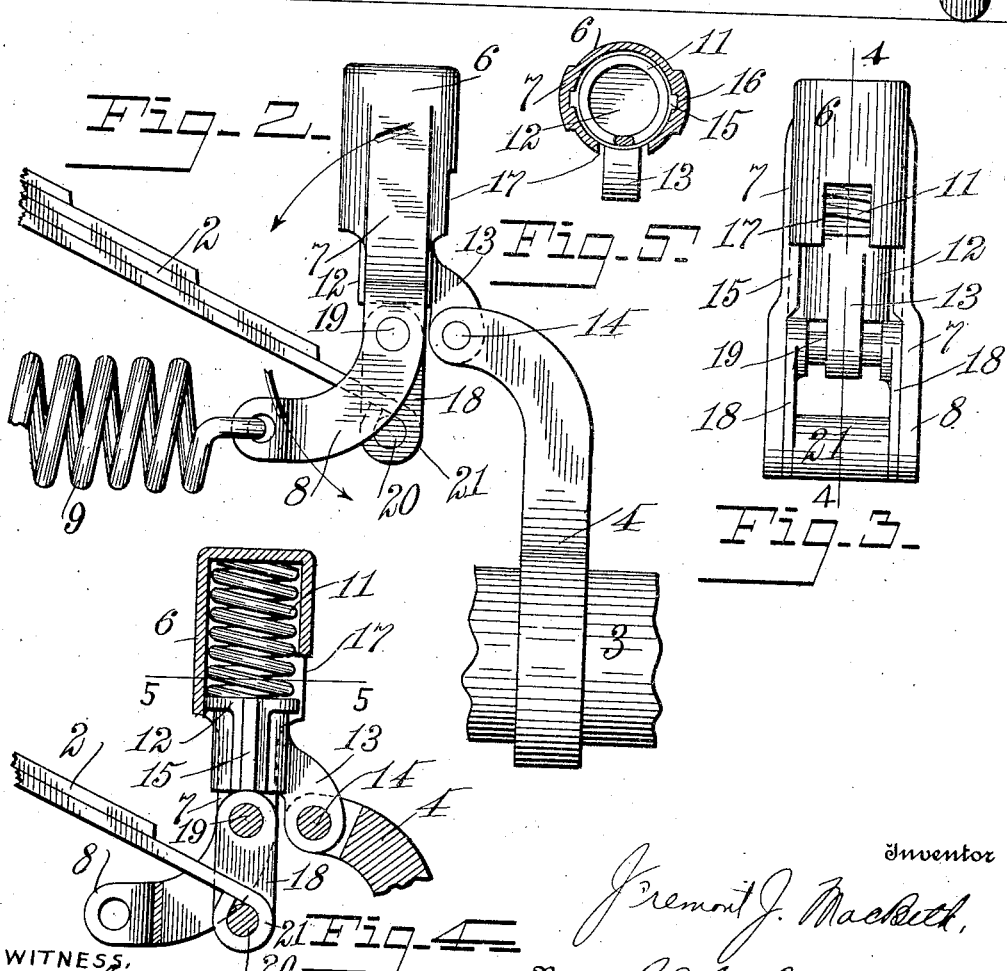

UNITED STATES PATENT OFFICE.

JEREMONT J. MACBETH, OF DAYTON, OHIO.

SHOCK-ABSORBER.

1,239,200.   Specification of Letters Patent.   Patented Sept. 4, 1917.

Application filed April 9, 1917. Serial No. 160,587.

*To all whom it may concern:*

Be it known that I, JEREMONT J. MACBETH, a citizen of the United States, residing at Dayton, in the county of Montgomery and State of Ohio, have invented certain new and useful Improvements in Shock-Absorbers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shock absorbers of a character adapted to be arranged between the spring and the axle or running gear of an automobile to relieve the body thereof from shocks due to passing over uneven roads or obstacles or the like. The object of the invention is to provide a device of this type with a capacity for absorbing the smaller as well as the greater vibrations before they are transmitted to the spring and through the spring to the body of the vehicle. The essential characteristics of my invention will be more fully comprehended from a detail description which will be given in connection with the accompanying drawings, said drawings being illustrations of the shock absorber as it is applied to an automobile.

Referring in more general terms to said drawings: Figure 1 is an elevation showing my improved shock absorber attached to the axle and springs of an automobile. Fig. 2 is an enlarged elevation of the shock absorber as it appears in Fig. 1 with parts of the vehicle spring and axle broken away. Fig. 3 is a detail elevation of parts as shown in Fig. 2 with other parts appearing in Fig. 2 removed. Fig. 4 is a vertical sectional view on the line 4—4 of Fig. 3, and Fig. 5 is a horizontal sectional view on the line 5—5 of Fig. 4.

In a particular description of my invention similar reference characters will indicate corresponding parts in both the description and the drawings.

In the drawings 1 designates a portion of the body of a vehicle, such as an automobile. The body 1 is supported in the usual manner upon springs 2 which are arranged above the axle 3. Between the spring 2 and the axle 3 my improved shock absorber is arranged.

One of these devices is placed between the lower end of each spring of the vehicle and consists as follows. 4 designates a bracket which is rigidly secured in any suitable way to the axle 3 adjacent to the wheel 5. It will be understood that there is a shock absorber interposed between the axle and each of the springs 2. A description of one of the shock absorbers will suffice for both as they are identical in their parts as shown in Fig. 1. 6 designates a cup or spring housing, which is rigidly attached to or an integral part of a yoke 7. The lower end 8 of said yoke is curved to a substantially horizontal position. Connected to the lower end of said yoke is a coil spring 9. The two springs 9 as shown in Fig. 1 may be connected by a suitable connection or as shown the springs 9 may be connected to the axle 3 by means of brackets 10, which are rigidly secured to the axle 3. A coil spring 11 is inclosed in the cup 6 and seats upon a plunger 12. The plunger 12 has projected from it an arm or extension 13 which is connected to the bracket 4 by a pivot pin 14. The plunger 12 is provided with oppositely lying ribs 15 which are guided in the cup 6 by being extended into corresponding grooves 16 in the opposite sides of the cup, as shown in Fig. 5. The side of the cup 6 on which the arm 13 lies is cut out as at 17 in order to allow the cup to descend and to compress the spring when moving downwardly under shocks from the position shown in Fig. 4. All of the parts of the device swing upon the pivot 14 when meeting shocks to which the vehicle may be subjected. 18 designates two links which are connected to the inner sides of the yoke 7 by a pivot pin 19. Between the lower ends of the links 18 a pin 20 is secured which provides means for connecting the lower end 21 of the vehicle spring 2. From the above description, it will be apparent that a connection is made between the shock absorber and the axle 3 by the bracket 4, and between the spring 2 and the shock absorber by means of the links 18. In meeting shocks the cup 6 is subjected to a swinging movement as well as a depressed movement, the latter movement being against the resistance of spring 11 and the former movement being on the pivot 14. The links 18 permit relative movement between the yoke 7 and the spring 2. The pivot 14 is a fixed pivot as to its location or position. When the body of the vehicle or car depresses, the cup 6 and the yoke 7 have a tendency to move in the direction of the arrow as indicated on the left of the cup 6, as shown in Fig. 2; and the cup being a fixed part of the yoke, the latter will have a tendency to swing in an opposite direction or in the direction of the arrow shown below the yoke in Fig. 2. In this action or swinging movement of the device on the pivot 14, the cup compresses the spring 11 and the yoke expands the spring 9 and thus the shocks are effectually absorbed, the smaller ones through comparatively slight movements of the device, and the larger shocks through relatively larger movements.

Having described my invention in a form which is preferred in view of the efficiency thereof, I desire to claim:

1. In a device of the character specified, the combination with a vehicle, the spring and the axle thereof, of a spring housing having a yoke extended therefrom, an expansion spring connected to said yoke, a plunger below said spring housing, an arm to which said plunger is pivoted, said arm being connected with the axle, a spring seated upon said plunger and confined within said spring housing, and a pivotal connection between the vehicle spring and said yoke, substantially as specified.

2. In a device of the character specified, the combination with a vehicle body, the supporting spring and axle thereof, of an inverted cup having a yoke extended therefrom, a spring connecting said yoke with a fixed part of the vehicle running gear, a plunger within said cup, an arm rigidly connected to said axle and to which an extension of said plunger is pivotally connected, a spring within said cup seated on said plunger, and a connection between the vehicle spring and said yoke, said connection being below the plunger and of a pivotal character, substantially as specified.

In testimony whereof I affix my signature, in presence of a witness.

JEREMONT J. MACBETH.

Witness:
MATTHEW SEIBLER.